No. 865,971.  
PATENTED SEPT. 10, 1907.

G. MAGNASCO.  
OVEN OR STOVE.  
APPLICATION FILED JUNE 14, 1904.

Attest:  
Ewd. L. Tolson  
C.S. Middleton

Inventor,  
Giovanni Magnasco  
By Richards & Co.  
Attys

UNITED STATES PATENT OFFICE.

GIOVANNI MAGNASCO, OF GENOA, ITALY, ASSIGNOR TO SOCIETA ITALIANA DEI FORNl, OF GENOA, ITALY.

OVEN OR STOVE.

No. 865,971.          Specification of Letters Patent.          Patented Sept. 10, 1907.

Application filed June 14, 1904. Serial No. 212,554.

*To all whom it may concern:*

Be it known that I, GIOVANNI MAGNASCO, a subject of the King of Italy, and a resident of Genoa, Italy, have invented certain new and useful Improvements in Baking-Ovens, of which the following is a specification.

This invention relates to improvements in baking ovens and has for its object to provide means for facilitating the insertion within the oven of the articles to be baked and the removal of the baked products therefrom.

The invention is illustrated in the accompanying drawings, in which,—

Figure 1:
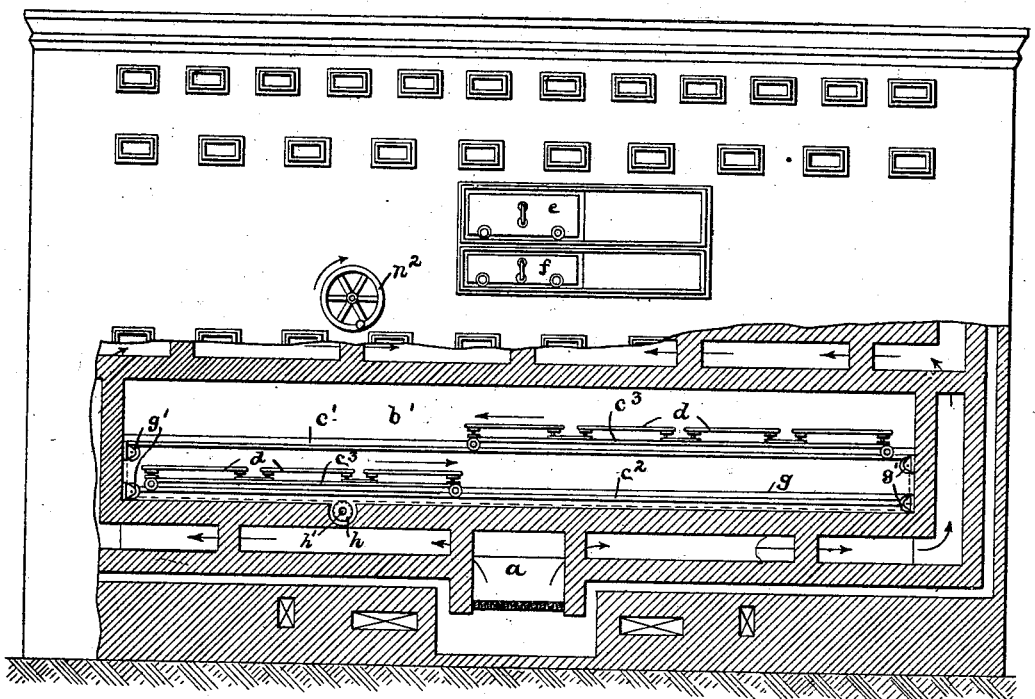
Figure 2:
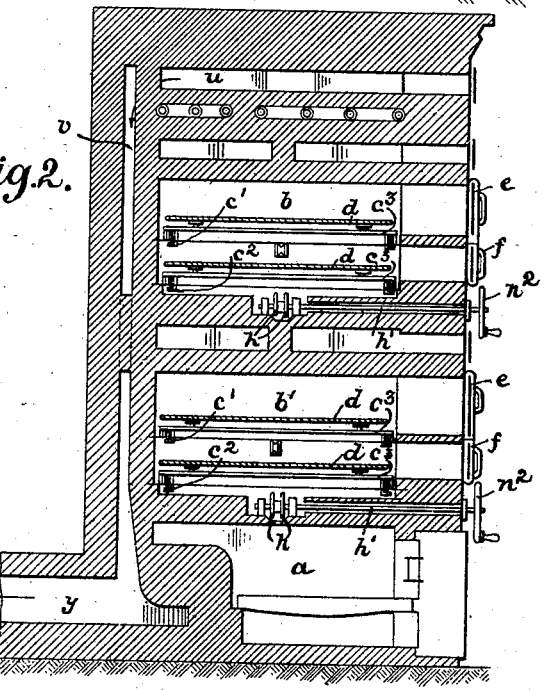

Figure 1 is a front elevation, partly in section, and Fig. 2 is a transverse sectional view.

Referring by reference characters to this drawing, it will be seen that the oven contains one or more horizontal baking chambers, two being shown for convenience as indicated at $b$, $b'$. Each of these chambers has lower and upper tracks or ways $c^1$, $c^2$, upon each of which is removably mounted a frame or carriage $c^3$ adapted to support a plurality of iron tables or baking trays $d$.

As indicated in Fig. 1 the two carriages are of such length that together they equal in length approximately the interior length of the baking chamber. The frames or carriages in each chamber are connected by an endless chain or the like, as indicated at $g$, which passes around guide wheels $g'$ at opposite ends of the baking chamber. Each sprocket chain meshes or engages with sprocket wheel $h$ carried on the shaft $h'$, projecting to the front of the furnace where it is provided with a suitable hand wheel $n^2$. The oven is provided opposite each chamber with lower and upper doors $e, f$, movable to uncover an opening of a sufficient size to enable the plates or trays with the products to be baked to be introduced into the oven and placed upon the carriages. By manipulating the hand wheel different portions of each carriage may be successively brought into line with its respective door opening whereby the entire surface of each carriage may be covered with baking plates, and in a similar manner the baked products may be removed from the oven. Thus the entire length of each baking chamber may be filled with products to be baked, which may be introduced and removed through a single set of doors located near the center of the oven.

The oven is designed to be heated from a furnace $a$ located in the lower part thereof through suitable passages in the walls surrounding or inclosing the baking chambers, but as these particular passages form no part of the present invention, a particular description thereof herein is deemed unnecessary. It is sufficient to say that after reaching the passage $u$ at the top of the oven the products of combustion pass down a passage $v$ at the back and thence through a horizontal flue $y$ to a suitable chimney not shown.

Having thus described my invention, what I claim is:—

1. A baking oven having a horizontally disposed chamber, tracks or guides in said chamber at different levels, a carriage moving on each track, baking plates supported by each carriage, and chains for moving said carriages, substantially as described.

2. A baking oven having a chamber, horizontal tracks in said chamber at different levels, a carriage on each track occupying approximately one half the length of the chamber, baking plates carried by said carriages, and means for moving the carriages in unison, substantially as described.

In witness whereof I have hereunto set my hand in the presence of two witnesses.

GIOVANNI MAGNASCO.

Witnesses:
GUISEPPE ROSSI,
COSTANTINO CITTALUGAL.